Oct. 26, 1948.  E. H. BUCKNELL ET AL  2,452,354
FAUCET VALVE ELEMENT
Filed Nov. 30, 1944
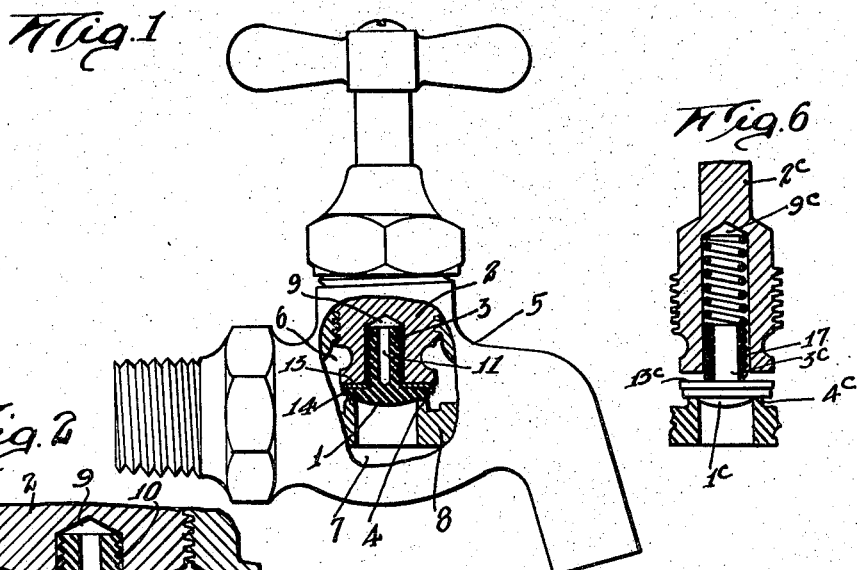
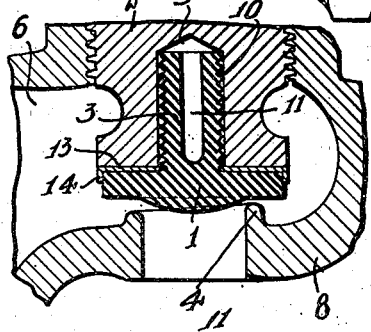
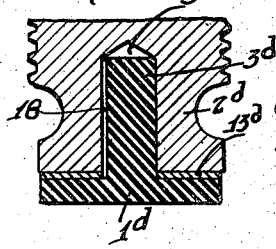
Inventors
Ernest H. Bucknell
Ralph E. Bletcher
By Lyon & Lyon
Attorneys Patented Oct. 26, 1948

2,452,354

UNITED STATES PATENT OFFICE 2,452,354

FAUCET VALVE ELEMENT

Ernest H. Bucknell and Ralph E. Bletcher, Los Angeles, Calif., assignors of ten per cent to Ralph E. Bletcher, twelve and one-half per cent to Ernest H. Bucknell, twelve and one-half per cent to Mabel Bucknell, ten per cent to Pearl White Bletcher, twenty-five per cent to Marcia Bucknell Liston, ten per cent to James H. Bletcher, ten per cent to Hazel Bletcher Skinner, and ten per cent to Charlotte R. B. Robinson, all of Los Angeles, Calif.

Application November 30, 1944, Serial No. 565,880

1 Claim. (Cl. 251—160)

This invention relates to "washers" or to the sealing elements of faucets, bibbs, or valves, and has for its object the provision of a closure or washer member which will, under all conditions of use, effect a closure with a valve seat irrespective of the conditions of irregularity of the seat, valve compression member, stem or variation of concentricity of the valve compression member and seat.

It is old in this art to suggest the use of a swivel disc as a carrier for a closure washer, which swivel discs permit a relative rotation of the washer with relation to the valve seat, valve stem or compression member. These suggestions, however, have met with little favor because they have not provided a solution to the problem of leaking faucets, bibbs or valves, while such swivel discs permit in theory the washer to engage the valve seat and then remain stationary as the compression member is threaded down to compress the washer against the seat. They do not permit the washer to accommodate itself in making the closure to such irregularities as inclined seats, eccentricity of valve seat and washer, irregularity of the formation of valve body, valve seat, and compression member, etc.

We have discovered that we are able to overcome all these problems and provide a washer or closure member which is of great durability, extremely efficient in accomplishing a complete valve closure, and which is self-adapting to all irregularity, and is inexpensive to manufacture and install by connecting the washer through the medium of a flexible stem or connecting element to the valve compression member.

In the drawings we have illustrated our invention in such form as we believe will illustrate the same and its new principles as well as some of its varied uses.

In the drawings:

Figure 1 is an elevation partly in section of one form of faucet, or valve, illustrating a closure means embodying our inventtion and illustrating the same in closed position upon a valve seat.

Figure 2 is an enlarged fragmental sectional view of the assembly of Figure 1 illustrating the closure means in the position of being compressed against an irregular seat.

Figure 3 is an enlarged view of the washer element of Figures 1 and 2.

Figure 4 is an enlarged fragmental sectional view of a modified form of closure member embodying our invention.

Figure 5 is an enlarged fragmental sectional view of a further modification of our invention.

Figure 6 is a an enlarged fragmental view of a still further modified form of our invention.

Figure 7 is an enlarged elevation of another modified form of closure member embodying our invention.

Our invention may best be understood by a brief explanation of its underlying principle which is of connecting the washer disc 1 with the compression element 2 through the medium of a flexible stem 3. This flexible stem may be formed as illustrated in Figures 1, 2 and 3 as an integral extension of the washer disc 1. It may also be formed as illustrated in Figure 4 as a separate part 3a and joined to the disc 1a by suitable means or it may be formed in a manner which will provide between the compression stem and the disc washer a flexible coupling element which will flex in all directions. By all directions we mean will permit tilting of the closure disc 1 to accommodate an inclined valve seat as illustrated in Figure 2, will flex in rotation to provide a swiveling function and will flex in a direction transversely of the stem to allow for proper alignment of the closure disc 1 with the valve seat even where the valve seat is eccentric with relation to the axis of the compression element 2.

In the Figures 1, 2 and 3 the compression member 2 is of a common form and is threaded into the body 5 of a common form of faucet. The valve disc 1 is adapted to engage the valve seat 4 to close communication between the passages 6 and 7 provided on opposite sides of the partition 8.

The compression element 2 is customarily screwed into the body 5 to force the valve disc against the seat 4.

In this modification the flexible stem 3 is connected with the compression member by forcing the same into an axial bore 9 so that it is frictionally held. The flexible stem is formed during the molding of the disc 1 and is thus formed of rubber or similar flexible material such as "neoprene" or the like.

The bore 9 is preferably smooth. In order to avoid entrapment of air in the bore 9 during insertion of the stem 3, any suitable means may be provided which will vent the bore. In the illustration of Figures 1, 2 and 3 we have shown the stem 3 as formed with helical threads 10 (Figure 3). These threads 10 may be of an external diameter larger than the internal diameter of the bore 9, thereby providing for increased friction and at the same time providing for the escape of air. Any suitable rib formation will, however, accomplish the same function so we have referred to these threads in the claims as ribs. The stem 3 may be formed hollow as indicated at 11 to permit compression thereof in insertion into the bore 9 to permit frictional engagement within the bore without distorting the threads or ribs to such an extent that the grooves therebetween are completely closed.

A further function of the cavity 11 is to limit the radial expansive force exerted by the flexible stem 3 against the walls of the bore 9 due to absorption of water. During the life of a device of this type the material employed will absorb water from the system and upon such absorption will expand. If the bore 11 were not provided, that is, if the stem 3 were solid, absorption of water would cause the stem 3 to expand in the bore 9 to such an extent that it would become firmly locked therein and incapable of turning relative to the bore, thus preventing proper functioning of the device and rendering breakage of the stem more likely. By providing the cavity 11 in the stem, it will be seen that absorption of water with the resultant expansion of the material will allow the material of the stem to expand inwardly without materially increasing the pressure on the walls of the bore 9. Thus, it will be seen that in operation the disc portion 1 will first be brought into contact with the seat 4, and further rotation of the stem 2 will cause relative rotation between that stem and the element 13. This will probably result in a slight slippage between the lowermost threads 10 and the bore 9 and torsional twisting of the flexible stem 3 thereabove. After the valve is seated and sufficient pressure exerted to effect a proper seal, the torsional strain in the flexible stem 3 will be relieved since the stress in that stem will tend to twist the upper part thereof in the bore 9 to bring the upper portion of the stem 3 to such position that the internal stresses are relieved. By insuring a relatively light radial pressure between the stem and the bore, that result will naturally be accomplished, and such light pressure is assured by provision of the cavity 11. It is to be further noted that the cavity 11 permits the stem 3 to be radially compressed for ready insertion into the bore 9 upon assembly of the device. The relative dimensions of the cavity 11 and the stem 3 are not critical, but it will be apparent that the cavity must be sufficiently large to permit substantial compression of the stem without complete closure or filling of the cavity.

In the modification of Figure 4 we have illustrated the disc 1ª as separately formed and secured to the stem 3ª by a suitable fastener 12 which is threaded into the rubber or other suitable flexible material of which the stem 3ª is constructed. In this modification increased frictional engagement between the compression member 2ª and the stem 3ª is provided by circular ribs 10ª which are longitudinally grooved to air vent the bore 9ª. In this modification the disc 1ª may swivel with relation to the compression element 2ª at either the fastening 12 or within the bore 9ª.

In the modifications of Figures 1 to 4, inclusive, we have shown an anti-friction washer 13 which may have a retaining flange 14, the function of which is to retain the discs 1 and 1ª. These anti-friction washers 13 are free of the compression member and provide an anti-friction bearing member which is interposed between the sealing discs 1 and 1ª and provide bearing elements to permit relative rotation between the compression stems and the said discs. The anti-friction washers 13 are apertured for the stems 3 and 3ª and permit freedom of movement of the sealing discs 1 and 1ª so that the said discs may move freely both in rotation and laterally with respect to the base surface of the compression stems to accommodate for valve or seat irregularities.

In the modified form of our invention as illustrated in Figure 5, similar parts have been designated with similar numerals with the addition of an exponent "b" thereto. In this modification we have shown the closure disc 1ᵇ as performing the functions of a packing gland for the compression element 2ᵇ in the body 5ᵇ as well as the closure element for the partition valve seat 4ᵇ. To accomplish this the faucet or valve is modified from the conventional form of Figure 1 to form a smooth bore 15 in the body 5 below the threads into which the compression member 2ᵇ is threaded.

The anti-friction washer 13ᵇ is a flat washer and peripherally engages within the smooth bore 9ᵇ. The disc 1ᵇ may have a fluid pressure annular expansion skirt 16. In this modification the valve seat 4ᵇ is a high seat that is extended from the partition of the valve so that the closure disc does not leave the bore 9ᵇ when engaging the said seat 4ᵇ.

In the modification of Figure 6, the valve is of the compression check type when the closure disc 1ᶜ is urged toward the seat 4ᶜ by means of a spring 17. The spring 17 is a cylindrical coil and the flexible stem 3ᶜ is retained within the said coil. An anti-friction washer 13ᶜ is also employed against which the spring 17 rests, the spring being retained in the bore 9ᶜ of the compression element 2ᶜ.

The modification of Figure 7 is similar to that of Figures 1, 2 and 3 except that the stem 3ᵈ has a smooth external surface and fits within a smooth bore 9ᵈ depending upon surface friction to retain the same in position. In this case a flat anti-friction washer 13ᵈ is also employed. A longitudinal surface groove 18 may be formed in the stem 3ᵈ or elsewhere to provide an air vent, thus permitting the stem 3ᵈ to be more easily inserted into the bore 9ᵈ.

We have herein illustrated our invention, together with its principle and operation in connection with several modifications which are illustrative of the many modifications our invention may take within the spirit of our appended claim.

We claim:

The combination with a faucet having a valve stem and a co-acting valve seat, of a washer element comprising a disc having an integral stem extending from the disc, the valve stem having a cylindrical bore formed therein, said integral stem having an open axial cavity extending inwardly from its free end to provide for radial compression of said integral stem, means for moving the valve stem toward the seat to engage the valve disc therewith whereby the valve disc may accommodate itself to irregularities of the valve seat and may be arrested from rotation with reference to the seat as the valve stem is rotated to complete the compression between the disc and the seat.

ERNEST H. BUCKNELL.
RALPH E. BLETCHER.

REFERENCES CITED

The following references are of record in the file of this patent:

UNITED STATES PATENTS

| Number | Name | Date |
| --- | --- | --- |
| 540,481 | Boyer | June 4, 1895 |
| 568,405 | Hills | Sept. 29, 1896 |
| 1,366,803 | Hofmann | Jan. 25, 1921 |
| 1,634,512 | Pyne | July 5, 1927 |
| 2,081,616 | Diamond | May 25, 1937 |
| 2,194,961 | Walker | Mar. 26, 1940 |
| 2,314,653 | McDevitt | Mar. 23, 1943 |
| 2,364,107 | Svirsky | Dec. 5, 1944 |